(12) United States Patent
Jeong et al.

(10) Patent No.: US 11,392,137 B2
(45) Date of Patent: Jul. 19, 2022

(54) ROBOT CLEANER AND CONTROL METHOD THEREOF

(71) Applicant: Samsung Electronics Co., Ltd., Suwon-si (KR)

(72) Inventors: Wonguk Jeong, Suwon-si (KR); Minjeong Kang, Suwon-si (KR); Seungsoo Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 211 days.

(21) Appl. No.: 16/812,983

(22) Filed: Mar. 9, 2020

(65) Prior Publication Data

US 2020/0293060 A1     Sep. 17, 2020

(30) Foreign Application Priority Data

Mar. 15, 2019   (KR) .................. 10-2019-0030067

(51) Int. Cl.
*A47L 11/40* (2006.01)
*G05D 1/02* (2020.01)
*A47L 9/28* (2006.01)

(52) U.S. Cl.
CPC .......... *G05D 1/0274* (2013.01); *A47L 9/2826* (2013.01); *A47L 11/4011* (2013.01);
(Continued)

(58) Field of Classification Search
CPC ............... G05D 1/0274; G05D 1/0246; G05D 2201/0215; G05D 2201/0203;
(Continued)

(56) References Cited

U.S. PATENT DOCUMENTS 9,402,518 B2   8/2016   Burlutskiy
10,365,659 B2  7/2019   Park et al.
(Continued)

FOREIGN PATENT DOCUMENTS

EP    2631730 A1 *  8/2013   ............... G05D 1/02
EP    1 967 116 B2   5/2015
(Continued)

OTHER PUBLICATIONS

Taneja et al., Moedor Cleaning Robot, 2018, IEEE, p. 1-5 (Year: 2018).*
(Continued)

*Primary Examiner* — Mcdieunel Marc
(74) *Attorney, Agent, or Firm* — Jefferson IP Law, LLP

(57) ABSTRACT

A robot cleaner is provided. A robot cleaner includes a cleaner main body, a battery configured to supply a power, a memory configured to store floor material information corresponding to each of a plurality of subspaces configuring a space, and a processor configured to identify a cleaning mode corresponding to each of the plurality of subspaces based on the floor material information corresponding to each of the plurality of subspaces, identify an order of priority of each of the plurality of subspaces based on the identified cleaning mode and a remaining amount of power, and set a movement path of the robot cleaner based on the identified order of priority.

20 Claims, 9 Drawing Sheets

(52) U.S. Cl.
CPC ....... *A47L 2201/04* (2013.01); *A47L 2201/06* (2013.01); *G05D 2201/0215* (2013.01)

(58) Field of Classification Search
CPC ............... A47L 9/2826; A47L 11/4011; A47L 2201/04; A47L 2201/06
See application file for complete search history.

(56) References Cited

U.S. PATENT DOCUMENTS

| | | | |
|---|---|---|---|
| 10,383,497 | B2 | 8/2019 | Han et al. |
| 11,172,607 | B2* | 11/2021 | Hahn ................... G05D 1/0225 |
| 2004/0178767 | A1 | 9/2004 | Jeon et al. |
| 2005/0171636 | A1* | 8/2005 | Tani ..................... G05D 1/0276 700/245 |
| 2008/0009964 | A1* | 1/2008 | Bruemmer ........... G05D 1/0223 700/245 |
| 2013/0035790 | A1* | 2/2013 | Olivier, III ......... G06K 9/00228 700/246 |
| 2017/0131721 | A1 | 5/2017 | Kwak et al. |
| 2018/0131856 | A1 | 5/2018 | Sato et al. |
| 2018/0184868 | A1 | 7/2018 | Han |
| 2018/0284792 | A1 | 10/2018 | Kleiner et al. |
| 2021/0200234 | A1* | 7/2021 | Song ................... G05D 1/0238 |
| 2021/0282613 | A1* | 9/2021 | Fong ..................... A47L 9/2894 |
| 2021/0331112 | A1* | 10/2021 | Kim ..................... A47L 9/2852 |
| 2021/0345847 | A1* | 11/2021 | Kwak ................... A47L 11/4002 |

FOREIGN PATENT DOCUMENTS

| | | |
|---|---|---|
| JP | 2013-242738 A | 12/2013 |
| JP | 2017-029249 A | 2/2017 |
| JP | 2018-078371 A | 5/2018 |
| KR | 10-0962593 B1 | 6/2010 |
| KR | 10-2016-0021991 A | 2/2016 |
| KR | 10-2016-0133348 A | 11/2016 |
| KR | 10-1822942 B1 | 1/2018 |
| KR | 10-2018-0079962 A | 7/2018 |

OTHER PUBLICATIONS

Jarande et al., Robotic Vacuum Cleaner Using Arduino with Wifi, 2018, IEEE, p. 1513-1517 (Year: 2018).*
Wang et al., Dynamic analysis of the hybrid recharging system with super-capacitors on the armed cleaner robot, 2009, IEEE, pg. (Year: 2009).*
Jeon et al., Multiple robots task allocation for cleaning a large public space, 2015, IEEE, p. 1-5 (Year: 2015).*
International Search Report with Written Opinion dated Jun. 26, 2020; International Appln. No. PCT/KR2020/003344.

* cited by examiner

100

ROBOT CLEANER AND CONTROL METHOD THEREOF

CROSS-REFERENCE TO RELATED APPLICATION(S)

This application is based on and claims priority under 35 U.S.C. § 119(a) of a Korean patent application number 10-2019-0030067, filed on Mar. 15, 2019, in the Korean Intellectual Property, the disclosure of which is incorporated by reference herein in its entirety.

BACKGROUND

1. Field

The disclosure relates to a robot cleaner and a control method thereof. More particularly, the disclosure relates to a robot cleaner which sets a movement path of the robot cleaner and a driving method thereof.

2. Description of Related Art

A robot cleaner is a device which automatically cleans a region to be cleaned, by sucking foreign materials, while travelling without any additional operations of a user.

Such a robot cleaner includes various sensors, in order to accurately and efficiently detect obstacles scattered in a travelling direction. A sensor included in the robot cleaner detects a position of an obstacle and a distance from the obstacle, and the robot cleaner determines a travelling direction using a detected result.

In related art, a robot cleaner determined a travelling direction or a movement path only based on information regarding an obstacle, and the robot cleaner had not determined a travelling direction or a movement path based on information regarding a space. In addition, a robot cleaner of the related art had a problem in that the robot cleaner frequently returns to a charging station during cleaning, due to determination of a travelling direction or a movement path, without considering a remaining amount of a battery.

It has been required to efficiently set a movement path of a robot cleaner, by considering information regarding a space, in which cleaning is executed, and a remaining amount of a battery.

The above information is presented as background information only, and to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a robot cleaner which sets a movement path of a robot cleaner by considering a floor material and a remaining amount of a battery and a control method thereof.

Additional aspects will be set forth in part in the description which follows and, in part, will be apparent from the description, or may be learned by practice of the presented embodiments.

In accordance with an aspect of the disclosure, a robot cleaner for achieving the afore-mentioned object is provided. The robot cleaner includes a cleaner main body, a battery configured to supply a power, a memory in which floor material information corresponding to each of a plurality of subspaces configuring a space is stored, and a processor which is configured to identify a cleaning mode corresponding to each of the plurality of subspaces based on the floor material information corresponding to each of the plurality of subspaces, identify an order of priority of each of the plurality of subspaces based on the identified cleaning mode and a remaining amount of power, and set a movement path of the robot cleaner based on the identified order of priority.

In accordance with another aspect of the disclosure, a sensor may be further included, and the processor may be further configured to obtain position information, shape information, and floor material information of each of the plurality of subspaces based on a signal received through the sensor, and obtain a map corresponding to the space based on the obtained information and store the map in the memory.

In accordance with another aspect of the disclosure, the sensor may include a camera, and the processor may be further configured to analyze an image received through the camera to obtain the floor material information.

In accordance with another aspect of the disclosure, the memory may be further configured to store information regarding a sound absorption coefficient at a frequency for each floor material, and, when a frequency signal output from the sensor is reflected by a floor of the subspace and detected through the sensor, the processor may be further configured to obtain the floor material information based on the information regarding the sound absorption coefficient and an intensity of the reflected frequency signal.

In accordance with another aspect of the disclosure, the processor may be further configured to obtain a cleaning mode corresponding to each of the plurality of subspaces and position information of each of the plurality of subspaces based on the map stored in the memory, identify an order of priority of each of the plurality of subspaces based on the identified cleaning mode and a remaining amount of power, and set a movement path of the robot cleaner based on the identified order of priority and the position information of each of the plurality of subspaces.

In accordance with another aspect of the disclosure, a cleaning mode corresponding to a first subspace among the plurality of subspaces may be a normal mode, a cleaning mode corresponding to a second subspace among the plurality of subspaces may be a power mode, and when a remaining amount of power is less than a threshold value, the processor may be further configured to apply an order of priority in an order of the first subspace and the second subspace.

In accordance with another aspect of the disclosure, when a remaining amount of power is equal to or more than a power amount required for cleaning the first subspace and less than a power amount required for cleaning both of the first subspace and the second subspace, the processor may be further configured to include a charging station configured to charge the battery, after cleaning the first subspace, in the movement path.

In accordance with another aspect of the disclosure, when a remaining amount of power is equal to or more than a threshold value, the processor may be further configured to apply an order of priority in an order of the second subspace and the first subspace.

In accordance with another aspect of the disclosure, when a remaining amount of power is equal to or more than a threshold value, the processor may be further configured to apply an order of priority in an order of a subspace closer to a current position of the robot cleaner based on position information of each of the first subspace and the second subspace.

In accordance with another aspect of the disclosure, a sensor may be further included, and the processor may be further configured to identify a pollution level of the first subspace based on a signal received through the sensor, while travelling along the set movement path, and change the cleaning mode from a normal mode to a power mode based on the identified pollution level and clean the first subspace.

In accordance with another aspect of the disclosure, a sensor may be further included, and when an object is detected through the sensor, the processor may be further configured to identify whether the object is a dynamic object or a static object, and when the object is identified as a dynamic object, exclude the subspace from the movement path based on at least one of shape information and floor material information of the subspace.

In accordance with another aspect of the disclosure, a display may be included, and the processor may be further configured to control the display to display various pieces of information supported by the robot cleaner.

In accordance with another aspect of the disclosure, a control method of a robot cleaner including floor material information corresponding to each of a plurality of subspaces configuring a space is provided. The method includes identifying a cleaning mode corresponding to each of the plurality of subspaces based on the floor material information corresponding to each of the plurality of subspaces, identifying an order of priority of each of the plurality of subspaces based on the identified cleaning mode and a remaining amount of power included in the robot cleaner, and setting a movement path of the robot cleaner based on the identified order of priority.

In accordance with another aspect of the disclosure, the method further includes obtaining position information, shape information, and floor material information of each of the plurality of subspaces based on a signal received through a sensor included in the robot cleaner, and obtaining a map corresponding to the space based on the obtained information and storing the map.

In accordance with another aspect of the disclosure, a sensor may include a camera, and the obtaining may include obtaining the floor material information by analyzing an image received through the camera.

In accordance with another aspect of the disclosure, the memory may include information regarding a sound absorption coefficient at a frequency for each floor material, and the obtaining may include, when a frequency signal output from the sensor is reflected by a floor of the subspace and detected through the sensor, obtaining the floor material information based on the information regarding the sound absorption coefficient and an intensity of the reflected frequency signal.

In accordance with another aspect of the disclosure, the method further includes obtaining a cleaning mode corresponding to each of the plurality of subspaces and position information of each of the plurality of subspaces based on the map, and wherein the setting of a movement path may include setting a movement path of the robot cleaner based on the identified order of priority and the position information of each of the plurality of subspaces.

In accordance with another aspect of the disclosure, the method further includes a cleaning mode corresponding to a first subspace among the plurality of subspaces may be a normal mode, a cleaning mode corresponding to a second subspace among the plurality of subspaces may be a power mode, and when a remaining amount of power is less than a threshold value, the identifying an order of priority may include applying an order of priority in an order of the first subspace and the second subspace.

In accordance with another aspect of the disclosure, the setting of a movement path may include, when a remaining amount of power is equal to or more than a power amount required for cleaning the first subspace and less than a power amount required for cleaning both of the first subspace and the second subspace, including a charging station configured to charge the battery, after cleaning the first subspace, in the movement path.

In accordance with another aspect of the disclosure, the identifying of an order of priority may include, when a remaining amount of power is equal to or more than a threshold value, applying an order of priority in an order of the second subspace and the first subspace.

In accordance with another aspect of the disclosure, the identifying of an order of priority may include, when a remaining amount of power is equal to or more than a threshold value, applying an order of priority in an order of a subspace closer to a current position of the robot cleaner based on position information of each of the first subspace and the second subspace.

According to various embodiments, cleaning using the robot cleaner may be efficiently executed, by identifying a suitable cleaning mode in accordance with a floor material in which cleaning is executed, and setting an optimal movement path in accordance with the identified cleaning mode and a remaining amount of a battery.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
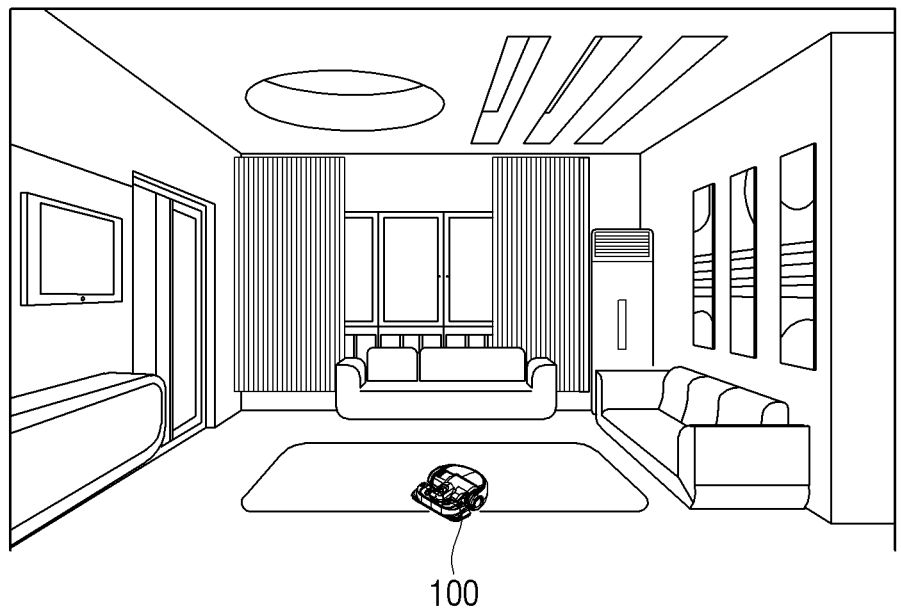
FIG. 1 is a diagram for describing a movement of a robot cleaner according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skilled in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In addition, in a certain case, there is also a term arbitrarily selected by the applicant, in which case the meaning will be described in detail in the description of the disclosure. Therefore, the terms used in the disclosure should be defined based on the meanings of the terms and the contents throughout the disclosure, rather than the names of the simple terms. In the specification, an expression of "have", "may have", "include", or "may include" indicates the presence of corresponding features (e.g.: values, functions, operations, or constituent elements such as components) and does not exclude the presence of additional features. An expression of at least one of A and/or B may be understood to indicate "A", "B", or any one of "A and B". Expressions "first", "second", and the like used in this specification may modify various constituent elements, regardless of an order and/or importance, are merely used for distinguishing one constituent element from the other constituent elements, and does not limit constituent elements. In a case where a certain constituent element (e.g.: first constituent element) is operatively or communicatively coupled with/to" or connected to another constituent element (e.g.: second constituent element), this may be understood as that a certain constituent element may be directly coupled with/to another constituent element or constituent elements may be coupled with/to each other through another constituent element (e.g.: third constituent element). Singular expressions include plural expressions, unless the context clearly indicates otherwise. In the application, the terms "include" or "configure" are intended to indicate the presence of features, numbers, operations, constituent elements, parts, or combinations thereof disclosed in the specification, and may be understood as that possibility of the presence or addition of one or more of different features, numbers, operations, constituent elements, parts, or combinations thereof is not excluded in advance. In the disclosure, a "module" or a "unit" executes at least one function or operation, and may be realized as hardware or software or a combination of hardware and software. In addition, a plurality of "modules" or a plurality of "units" may be integrated as at least one module and realized as at least one processor (not shown), except a "module" or a "unit" which is necessarily realized as specific hardware.

In the specification, a user may be referred to as a person who uses an electronic device or a device (e.g.: artificial intelligence electronic device) which uses an electronic device.

Hereinafter, an embodiment of the disclosure will be described in more detail with reference to the accompanying drawings.

FIG. 1 is a diagram for describing a movement of a robot cleaner according to an embodiment of the disclosure.

A robot cleaner 100 means a device which is driven by electric power to automatically suck, vacuum, sweep, or otherwise remove and/or collect foreign materials from a surface. In FIG. 1, the robot cleaner 100 is shown by assuming a case where the robot cleaner 100 is realized in a flat shape to come into close contact with a floor, in order to suck foreign materials on the floor, but this is merely one embodiment, and the robot cleaner 100 may be realized in various shapes and sizes.

Referring to FIG. 1, the robot cleaner 100 may be operated in different cleaning modes in accordance with floor materials. As an example, the robot cleaner 100 may be operated in different cleaning modes, in a case of sucking foreign materials on a carpet and in a case of sucking foreign materials on a tile.

Assuming that the robot cleaner 100 according to one embodiment of the disclosure is driven in a private house, the robot cleaner 100 may be operated in different cleaning modes in accordance with a floor material for each subspace in the private house. Here, the subspace may mean one independent space surrounded by walls. In addition, a floor material may be determined in accordance with a material or a raw material used for a floor of the subspace. For example, the floor material of the subspace may be realized with carpet, tile, sheet, linoleum, concrete, or hardwood.

The robot cleaner 100 according to one embodiment may include information regarding a floor material corresponding to each of a plurality of subspaces configuring a space (for example, house), and identify a cleaning mode for each subspace based on the information. Then, the robot cleaner 100 may set a movement path of the robot cleaner 100 based on the identified cleaning mode. This will be described in detail with reference to FIG. 2.

Figure 2:
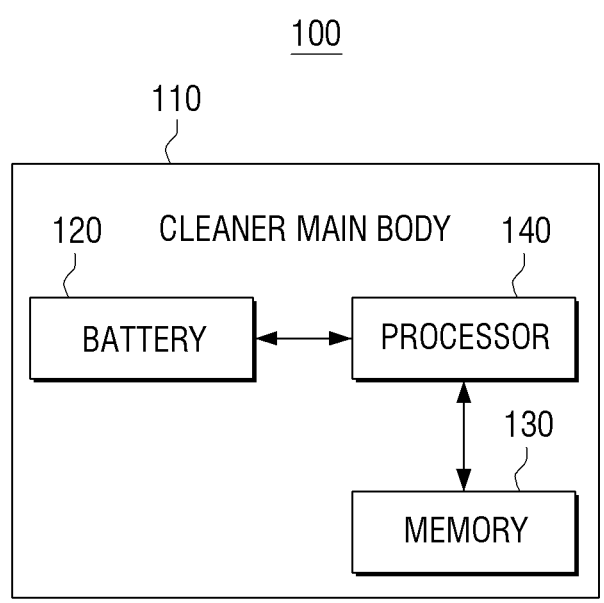
FIG. 2 is a block diagram showing a configuration of a robot cleaner according to an embodiment of the disclosure.

FIG. 2 is a block diagram showing a configuration of a robot cleaner according to an embodiment of the disclosure.

Referring to FIG. 2, the robot cleaner 100 includes a cleaner main body 110, and the cleaner main body 110 includes a battery 120, a memory 130, and at least one processor 140. Wireless communication features (not shown) can also be included.

The battery 120 may be a device which supplies power to a power to the cleaner main body 110, in order to drive the robot cleaner 100. In addition to the cleaner main body 110, the battery 120 may be electrically coupled to a driving and/or steering unit (not shown) for driving various parts mounted on the robot cleaner 100 and supply a driving power. Here, the battery 120 may be a rechargeable secondary battery, and when the robot cleaner 100 completes cleaning and is combined with a charging station (not shown), the battery 120 may be charged through a power supplied from the charging station.

The cleaner main body 110 may include a sucking unit (not shown) which is formed on a lower surface of the robot cleaner 100 and removes or sucks foreign materials existing on a floor. As an example, the sucking unit may include a brush unit, a rag, or the like, and suck foreign materials on a lower portion, during movement or stop of the robot cleaner 100. In addition, the sucking unit according to one embodiment may further include an air purification unit which purifies pollutants in the air. In addition, the cleaner main body 110 may include a driving unit. Here, the driving unit includes driving wheels and casters. Two driving wheels may be disposed on right and left edges of a center region of a lower portion of the cleaner main body 110 to be symmetrical to each other. The driving wheel may be configured to perform movement operations such as forward, backward, and rotatory travelling, and the like, in a process in which the robot cleaner 100 executes cleaning. The casters may be installed on front or rear edges of a lower portion of the cleaner main body 110 with respect to a travelling direction, and rotation angles thereof may be changed in accordance with a state of a floor, on which the robot cleaner 100 moves, so that the cleaner main body 110 keeps a stable posture. The driving wheel and the caster may be configured as one assembly and may be detachably mounted on the cleaner main body 110.

The memory 130 stores various pieces of data such as an operating system (O/S), a software module, an application, and the like for driving the robot cleaner 100.

Particularly, the memory 130 according to one embodiment of the disclosure may store floor material information corresponding to each of a plurality of subspaces configuring a space. As an example, the robot cleaner 100 may identify that a first subspace in the space is realized with a floor with a carpet material and a second subspace is realized with a floor with a tile material based on the floor material information stored in the memory 130. This is merely one embodiment, and the floor material information may be realized with data in various forms. Various methods for obtaining the floor material information corresponding to the subspace by the robot cleaner 100 will be described later.

The memory 130 according to one embodiment is realized with an internal memory such as a read-only memory (ROM) (for example, electrically erasable programmable read-only memory (EEPROM), a random-access memory (RAM), or the like included in the processor 140, or realized with a memory separated from the processor 140. In this case, the memory 130 may be realized in a memory form embedded in the robot cleaner 100 or realized in a memory form which is detachable from the robot cleaner 100, in accordance with data storage purpose. For example, in a case of data for driving the robot cleaner 100, the data may be stored in a memory embedded in the robot cleaner 100, and in a case of data for an extension function of the robot cleaner 100, the data may be stored in a memory which is detachable from the robot cleaner 100. The memory embedded in the robot cleaner 100 may be realized with at least one of a volatile memory (e.g.: a dynamic RAM (DRAM), a static RAM (SRAM), or a synchronous dynamic RAM (SDRAM)) and a non-volatile memory (e.g.: a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g.: a NAND flash or a NOR flash), a hard drive, or a solid state drive (SSD)), and the memory which is detachable from the robot cleaner 100 may be realized in a form of a memory card (for example, a compact flash (CF), an secure digital (SD), a micro secure digital (Micro-SD), a mini secure digital (Mini-SD), an extreme digital (xD), or a multi-media card (MMC)), an external memory which may be coupled to a universal serial bus (USB) port (for example, a USB memory), and the like.

The processor 140 controls general operations of the robot cleaner 100.

The processor 140 may be realized with a digital signal processor (DSP), a microprocessor, or a time controller (TCON) which processes digital signals. However, there is no limitation thereto, and the processor may include one or more of a central processing unit (CPU), a micro controller unit (MCU), a micro processing unit (MPU), a controller, an application processor (AP), a graphics-processing unit (GPU) or a communication processor (CP), and an ARM processor, or may be defined as a term thereof. In addition, the processor 140 may be realized with a system on chip (SoC) or a large-scale integration (LSI) with embedded processing algorithm or realized in a form of a field programmable gate array (FPGA). The processor 140 may execute various functions by executing computer executable instructions stored in the memory 130.

Particularly, the processor 140 according to one embodiment of the disclosure may set cleaning modes of the robot cleaner 100 in a different manner in accordance with a floor material. As an example, the robot cleaner 100 may execute cleaning of a floor with a carpet material in a power mode and execute cleaning of a floor with a tile material in a normal mode. This is merely one embodiment, and the robot cleaner 100 may include a plurality of cleaning modes, and may select any one of the plurality of cleaning modes in accordance with floor materials and execute the cleaning. For example, the robot cleaner 100 may include various cleaning modes such as a carpet cleaning mode, a tile cleaning mode, a hardwood cleaning mode, a dry cleaning mode, a wet cleaning mode, and the like, select any one cleaning mode corresponding to a floor material among the plurality of cleaning modes, and execute the cleaning. Here, names of the cleaning modes such as the power mode, the normal mode, and the like are merely one embodiment and not limited thereto. The memory 130 may store information regarding a cleaning mode for each floor material, in advance. The processor 140 may identify a cleaning mode corresponding to a floor material based on the information.

The processor 140 according to one embodiment of the disclosure may control a suction force with respect to foreign materials or a movement speed of the cleaner main body 110 in a different manner in accordance with the cleaning mode. For example, the processor 140 may relatively increase a suction force of the robot cleaner 100 or relatively decrease a movement speed of the cleaner main body 110 in the power mode. As another example, the processor 140 may relatively decrease a suction force of the robot cleaner 100 or relatively increase a movement speed of the cleaner main body 110 in the tile cleaning mode. Hereinafter, the cleaning mode will be described by dividing into a power mode and a normal mode, for convenience of description.

The processor 140 according to one embodiment of the disclosure may identify a cleaning mode corresponding to each of the plurality of subspaces based on floor material information corresponding to each of the plurality of subspaces.

For example, the processor 140 may identify a floor material of each of the plurality of subspaces based on the floor material information stored in the memory 130. As an example, the processor 140 may identify that the floor material of the first subspace is a carpet and the floor material of the second subspace is linoleum. Then, the processor 140 may identify the cleaning mode corresponding to each of the plurality of subspaces. The robot cleaner 100 according to one embodiment may store information regarding the cleaning mode for each of the plurality of floor materials in advance. As an example, when the floor material of the first subspace is identified as a carpet, the processor 140 may identify the cleaning mode corresponding to the first subspace as the power mode based on the information stored in advance. As another example, when the floor material of the second subspace is identified as linoleum, the processor 140 may identify the cleaning mode corresponding to the second subspace as the normal mode. As another example, when the floor material of the subspace is not identified or the cleaning mode corresponding to the floor material is not identified based on the information stored in advance, the processor 140 may set the cleaning mode of the robot cleaner 100 as the normal mode.

Then, the processor 140 according to one embodiment of the disclosure may identify an order of priority of each of the plurality of subspaces based on the identified cleaning mode and a remaining amount of the battery 120. The processor 140 may set a movement path of the robot cleaner 100 based on the identified order of priority. This will be described in detail with reference to FIG. 3.

Figure 3:
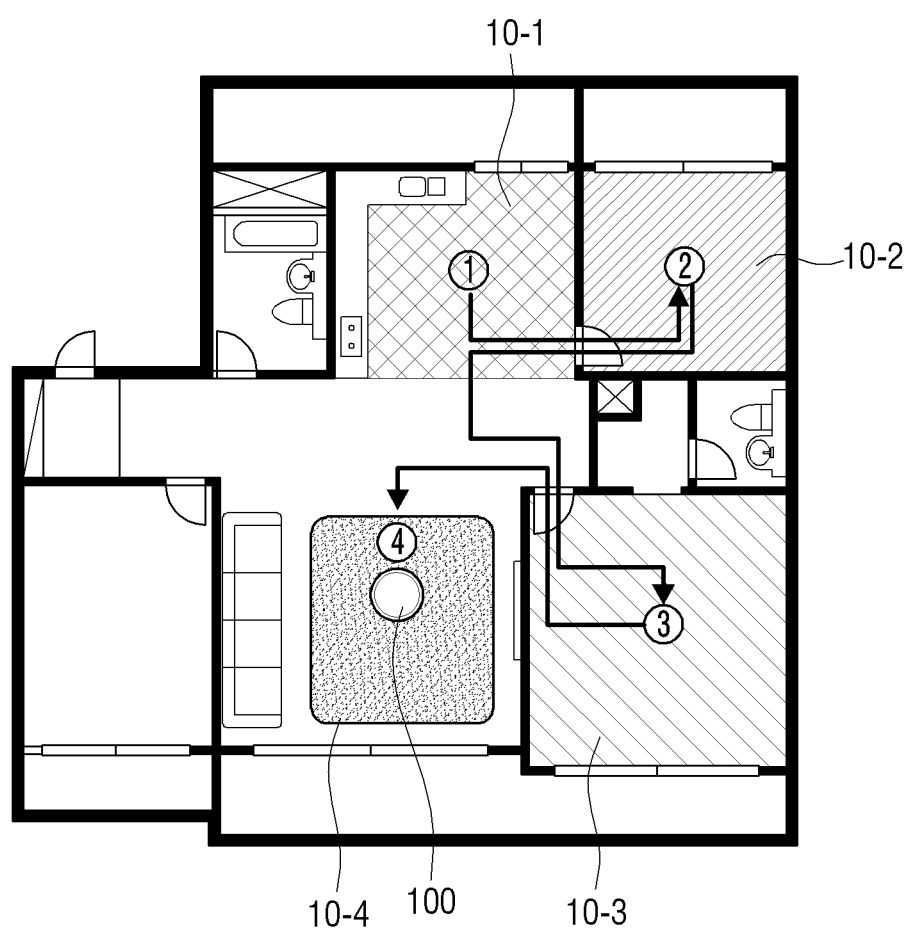
FIG. 3 is a diagram for describing a map according to an embodiment of the disclosure.

FIG. 3 is a diagram for describing a map according to an embodiment of the disclosure.

The processor 140 according to one embodiment of the disclosure may obtain position information, shape information, and floor material information of each of the plurality of subspaces based on a signal received through a sensor (not shown) included in the robot cleaner 100. Then, the processor 140 may obtain a map corresponding to the space based on the identified information and store the map in the memory 130.

Here, the position information of the subspace may mean a positional relationship with another adjacent subspace. As an example, referring to FIG. 3, a first subspace 10-1 may be positioned to be adjacent to a second subspace 10-2 and a fourth subspace 10-4. The shape information of the subspace may mean information regarding an area, a size, a shape, and the like of the identified subspace, with respect to a wall surrounding the subspace, or furniture, stairs, or a threshold positioned in the subspace.

Referring to FIG. 3, the processor 140 may identify the floor material of the subspace based on the map corresponding to the space stored in the memory 130. For example, the processor 140 may identify that the floor material of the first subspace 10-1 is marble, the floor material of the second subspace 10-2 and the floor material of a third subspace 10-3 are floor covering made of PVC, and the floor material of one region of the fourth subspace 10-4 is a carpet. Then, the processor 140 may identify the cleaning mode corresponding to each of the first to fourth subspaces 10-1, ..., 10-4. For example, the cleaning mode corresponding to the first to third subspaces 10-1, 10-2, and 10-3 may the normal mode, and the cleaning mode corresponding to the fourth subspace 10-4 may be the power mode.

The amount of the battery 120 consumed and the amount of power required for the cleaning of the robot cleaner 100 may vary depending on the cleaning mode. As an example, the processor 140 increases a suction force of the robot cleaner 100 in the power mode, and accordingly, the amount of battery 120 consumed, power consumption, and a power amount of the robot cleaner 100 may increase. As another example, the suction force of the robot cleaner 100 decreases in the normal mode or a low noise mode, compared to that in the power mode, and accordingly, the amount of battery 120 consumed, power consumption, and the power amount may relatively decrease. As another example, the cleaning mode may be referred to as a suction mode. Here, the suction mode may be divided in accordance with a suction intensity. For example, the suction mode may be divided into operation modes 1 to 5 in accordance with the suction intensity, and as the suction mode has a high suction intensity, the power amount required for the cleaning may be great.

Since the amount of battery 120 consumed is different depending on the cleaning mode, the processor 140 according to one embodiment of the disclosure may apply an order of priority to each of the first to fourth subspaces 10-1, ..., 10-4 based on the identified cleaning mode and the remaining amount of the battery 120. The processor 140 according to one embodiment of the disclosure may apply the order of priority to the plurality of subspaces based on the remaining amount of the battery 120, so that a greatest number of subspaces may be cleaned.

Referring to FIG. 3, when the remaining amount of the battery 120 is less than a threshold value, the processor 140 may apply a high priority to the first to third subspaces 10-1, 10-2, and 10-3, in which the cleaning is executed in the normal mode, and apply a low priority to the fourth subspace 10-4, in which the cleaning is executed in the power mode. Here, the threshold value may mean remaining capacity with respect to total capacity of the battery 120 which is less than a predetermined percentage (%), a remaining amount less than a power amount required for cleaning the subspace closest to a current position of the robot cleaner 100, a remaining amount less than a power amount required for cleaning at least one subspace among the plurality of subspaces, a remaining amount less than a power amount required for cleaning at least two subspaces among the plurality of subspaces, or a remaining amount less than a power amount required for cleaning all of the plurality of subspaces. This is merely one embodiment, and the threshold value may be variously changed depending on manufacturing purpose of a manufacturer the setting of a user.

The memory 130 according to one embodiment of the disclosure may store information regarding a power amount required for cleaning a unit area for each cleaning mode. The processor 140 according to one embodiment may identify a power amount required for cleaning an area corresponding to the shape information of the subspace based on the corresponding information.

When a high priority is applied to the fourth subspace 10-4, in which the cleaning is executed in the power mode, the robot cleaner 100 may execute the cleaning in the power mode only for the fourth subspace 10-4, and may not execute the cleaning of the first to third subspaces 10-1, 10-2, and 10-3, till the charging, due to discharge of the battery. On the other hand, when the processor 140 applies a high priority to the first to third subspaces 10-1, 10-2, and 10-3, in which the cleaning is executed in the normal mode, and applies a low priority to the fourth subspace 10-4, in which the cleaning is executed in the power mode, the robot cleaner 100 may clean a relatively large number of subspaces (for example, first to third subspaces 10-1, 10-2, and 10-3), although the remaining amount of the battery 120 is less than the threshold value.

Next, the processor 140 may set a movement path of the robot cleaner 100 based on the order of priority and the position information corresponding to each of the plurality of subspaces. As another example, when the remaining amount of the battery 120 is equal to or more than the threshold value, the processor 140 may apply a high priority to the fourth subspace 10-4, in which the cleaning is executed in the power mode, and apply a low priority to the first to third subspaces 10-1, 10-2, and 10-3, in which the cleaning is executed in the normal mode.

Returning to FIG. 2, the robot cleaner 100 according to one embodiment of the disclosure may include a sensor, and obtain position information, shape information, and floor material information of each of the plurality of subspaces based on a signal received through the sensor. This will be described in detail with reference to FIG. 4.

Figure 4:
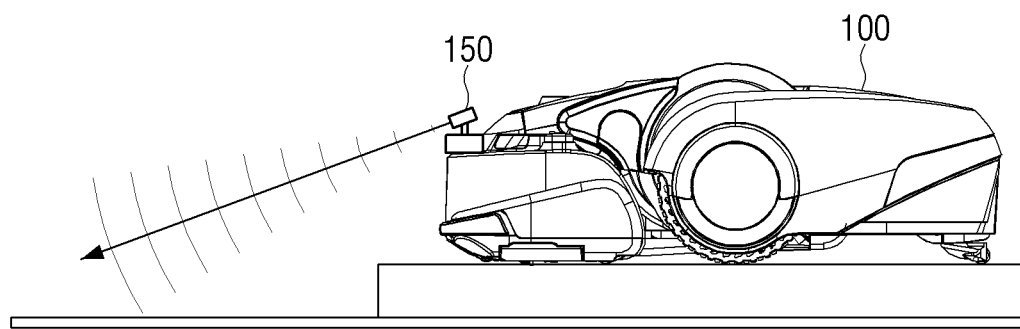
FIG. 4 is a diagram for describing a sensor included in a robot cleaner according to an embodiment of the disclosure.

FIG. 4 is a diagram for describing a sensor included in a robot cleaner according to an embodiment of the disclosure.

Referring to FIG. 4, the robot cleaner 100 according to one embodiment of the disclosure may include a sensor 150 and detect information regarding an object around the cleaner main body 110. For example, the sensor 150 may include a camera for obtaining a moving image around the cleaner main body 110, an ultrasonic sensor, an infrared sensor, a vision sensor which may execute position recognition, or the like.

The sensor 150 according to one embodiment of the disclosure may include a camera and obtain an image obtained by imaging a lower side of the cleaner main body 110 or a floor portion through the camera. Then, the processor 140 may obtain the floor material information by analyzing the captured image.

As another example, the sensor 150 according to one embodiment of the disclosure may output a frequency signal and detect a frequency signal reflected by the floor of the subspace. For example, when the sensor 150 includes an ultrasonic sensor, the sensor 150 may radiate an ultrasonic pulse and receive a reflected wave reflected by the floor. The memory 130 according to one embodiment of the disclosure may include information regarding a sound absorption coefficient at a frequency for each floor material.

The processor 140 according to one embodiment may identify the floor material of the subspace based on an intensity of the reflected frequency signal (or received reflected wave) and the information regarding the sound absorption coefficient stored in the memory 130.

As another example, the processor 140 may include an infrared sensor and detect infrared light emitted from the floor. Then, the processor 140 may identify the floor material based on the detected infrared light.

The processor 140 according to one embodiment of the disclosure may analyze existence or non-existence of an obstacle, a position of an obstacle, or a distance from an obstacle based on the signal received through the sensor 150. Here, the obstacle may mean a wall surrounding the subspace, or furniture, household appliances, or a threshold positioned in the subspace. Then, the processor 140 may obtain shape information of the subspace, position information of the subspace, and the like based on the analyzed result. The processor 140 according to one embodiment of the disclosure may obtain information regarding each of the plurality of subspaces configuring the space through the sensor 150, in initial driving of the robot cleaner 100. Here, the information regarding the subspace may include the shape information, the position information, and the floor material information of the subspace. Then, the processor 140 may obtain a map based on the obtained information regarding the plurality of subspaces and store the map in the memory 130. As another example, the processor 140 may update the map stored in the memory 130 based on the signal detected through the sensor 150. As another example, the processor 140 may store a map received from an external server (not shown) in the memory 130. The map according to one embodiment may be in an image file format such as a floor plan of the space. This may include information regarding a space partitioned by a user or a subspace (for example, a living room, a kitchen, or a bedroom) partitioned by an obstacle (or a structure) from the entire space, in which the robot cleaner 100 may move, and include position information and shape information (for example, size and area) of each space.

When it is identified that the space is changed, the processor 140 according to another embodiment of the disclosure may obtain a new map, in addition to the map stored in the memory 130. For example, a new map may be obtained based on information regarding a plurality of subspaces configuring the changed space.

Returning to FIG. 2, the processor 140 according to one embodiment of the disclosure may variously set a movement path based on a remaining amount of the battery 120 and the cleaning mode corresponding to the subspace. This will be described in detail with reference to FIGS. 5 and 6.

Figure 5:
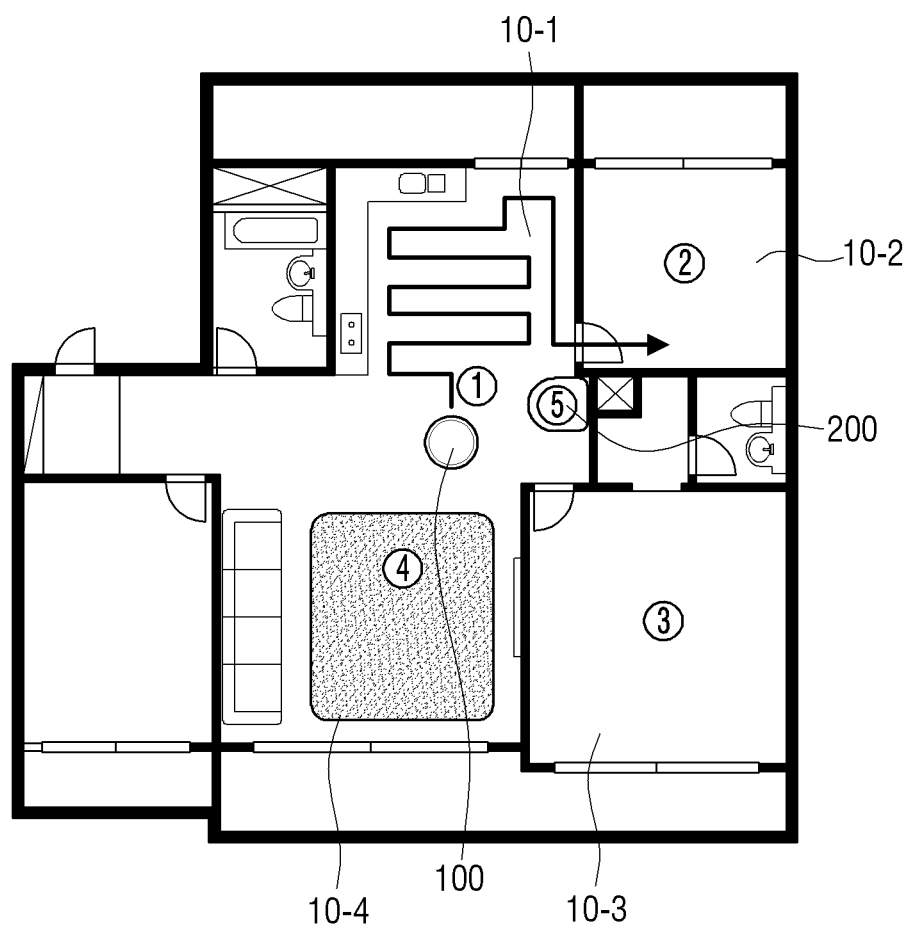
FIG. 5 is a diagram for describing a movement path of a robot cleaner according to an embodiment of the disclosure.

FIG. 5 is a diagram for describing a movement path of a robot cleaner according to an embodiment of the disclosure.

When the remaining amount of the battery 120 is equal to or more than a threshold value, the processor 140 according to one embodiment of the disclosure may apply an order of priority in an order of a subspace closer to a current position of the robot cleaner 100 based on the position information of each of the first subspace 10-1 and the second subspace 10-2. Referring to FIG. 5, the processor 140 may identify that the subspace closest to the current position of the robot cleaner 100 is the first subspace 10-1 based on the map stored in the memory 130. Then, since the remaining amount of the battery 120 is equal to or more than the threshold value, the processor 140 may control the robot cleaner 100 to sequentially execute the cleaning from the closest subspace. Accordingly, the robot cleaner 100 may execute the cleaning in the order of the first subspace 10-1, the second subspace 10-2, and the third subspace 10-3.

As another example, when the remaining amount of the battery 120 is less than the threshold value, the processor 140 according to one embodiment of the disclosure may apply a high priority to the first subspace 10-1. For example, the floor material of the first subspace 10-1 may be marble and the cleaning mode corresponding to marble may be a low noise mode. The floor material of the second subspace 10-2 may be a carpet and the cleaning mode corresponding to the carpet material may be the power mode. Here, the amount of the battery 120 consumed in the low noise mode may be relatively smaller than that in the normal mode, the power mode, or the like. The processor 140 may apply a high priority to the first subspace 10-1 having the marble material which is a subspace which may be cleaned with the current remaining amount of the battery 120. When a high priority is applied to the second subspace 10-2, although the current remaining amount of the battery 120 is less than the power amount require for cleaning the second subspace 10-2, the battery 120 may be discharged while cleaning the second subspace 10-2 or the robot cleaner 100 may return to a charging station 200 at a fifth subspace. The processor 140 may apply an order of priority so that the battery 120 is not discharged while cleaning the subspace or so that the robot cleaner 100 does not return to the charging station 200.

Figure 6:
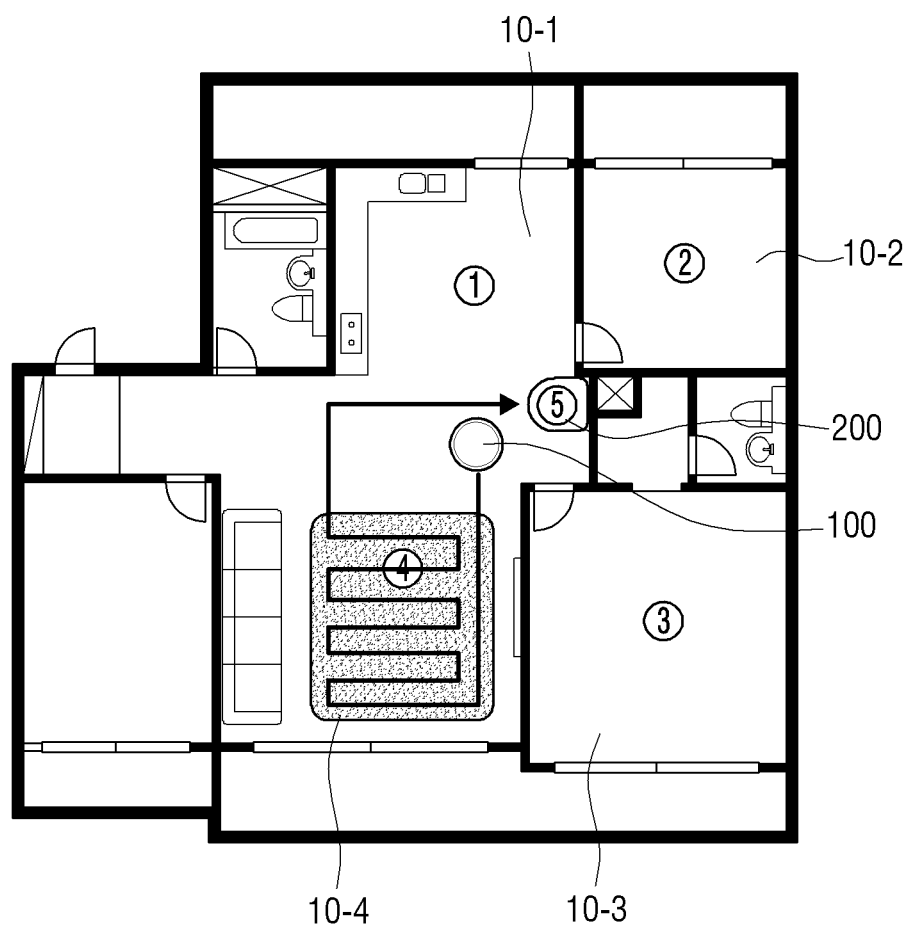
FIG. 6 is another diagram for describing a movement path of a robot cleaner according to an embodiment of the disclosure.

FIG. 6 is a diagram for describing another movement path of a robot cleaner according to an embodiment of the disclosure.

The processor 140 according to one embodiment of the disclosure may identify a power amount required for cleaning each of the plurality of subspaces. Then, when the remaining amount of the battery 120 is equal to or more than a power amount required for cleaning the fourth subspace 10-4 which is the closest to the robot cleaner 100 among the plurality of subspaces and is less than a power amount required for cleaning all of the first subspace 10-1 to the fourth subspace 10-4, the charging station 200 to charge the battery 120, after cleaning the fourth subspace 10-4, may be included in the movement path.

Referring to FIG. 6, the processor 140 may determine that the remaining amount of the battery 120 is sufficient for cleaning the fourth sub-region 10-4 having a carpet material in the power mode but insufficient for cleaning other remaining sub-regions. In this case, the processor 140 may include a path of executing the cleaning in the power mode by applying a high priority to the fourth sub-region 10-4 having a carpet material and then returning to the charging station 200, in the movement path. According to one embodiment, the processor 140 may control the robot cleaner 100 to return to the charging station 200 to execute the charge of the battery and then clean the other remaining sub-regions. For example, when the movement path is set in the order of the fourth sub-region 10-4 and the third sub-region 10-3, the processor 140 may control the robot cleaner 100 to execute the cleaning in the order of the fourth sub-region 10-4, the charging station 200, and the third sub-region 10-3.

The processor 140 according to one embodiment may return the robot cleaner 100 to the charging station 200 to fully charge (for example, 100%) the battery 120, but the battery 120 may be partially charged. For example, the processor 140 may charge the battery 120 by a power amount required for cleaning the other sub-regions. As another example, the processor 140 may charge the battery 120 so that the remaining amount of the battery 120 is equal to or more than the threshold value.

The processor 140 according to one embodiment of the disclosure may set a movement path for minimizing a period of time required for cleaning the plurality of subspaces. As an example, the processor 140 may include a return to the charging station 200 to charge the battery 120 in the movement path based on a difference between the remaining amount of the battery 120 and a total of amounts of the battery 120 consumed required for cleaning the plurality of subspaces.

The processor 140 according to one embodiment may identify a total of the amounts of the battery 120 consumed required for cleaning each of the plurality of subspaces. For example, when the amount of the battery 120 consumed required for cleaning the first subspace is 40%, the amount of the battery 120 consumed required for cleaning the second subspace is 20%, and the amount of the battery 120 consumed required for cleaning the third subspace is 30%, the processor 140 may identify a total of the amounts of battery 120 consumed as 90%. Then, when the current remaining amount of the battery 120 is 80%, the processor 140 may include a return to the charging station 200 in the movement path and charge the battery 120 by 10%.

The processor 140 according to another embodiment may identify the power amount and the period of time required for cleaning each of the plurality of subspaces. As an example, the period of time of cleaning required for cleaning the first subspace may be identified as 10 minutes and the required amount of the battery 120 consumed (or power amount) may be identified as 40%. Then, the period of time of cleaning required for cleaning the second subspace may be identified as 20 minutes and the required amount of the battery 120 consumed may be identified as 30%. Then, the period of time of cleaning required for cleaning the third subspace may be identified as 10 minutes and the amount of the battery 120 consumed may be identified as 20%.

When the current remaining amount of the battery 120 is 80%, the processor 140 may identify that the charge of the battery 120 by 10% is required for cleaning the first to third spaces. In this case, the processor 140 may include a return to the charging station 200 while cleaning the first to third subspaces, in the movement path, based on the period of time required to charge the battery 120. As an example, the processor 140 may assume that the period of time necessary to charge the battery 120 increases, when the battery 120 is discharged (for example, the remaining amount of the battery 120 is 0%) or as the battery 120 is nearly fully charged (for example, the remaining amount of the battery 120 is 100%). For example, in a case of charging the battery 120 from 0% to 10%, the period of time required to charge the battery 120 is 15 minutes, in a case of charging the battery 120 from 10% to 80%, the period of time required is 70 minutes, and in case of charging the battery 120 from 80% to 100%, the period of time required is 30 minutes. In this case, when the remaining amount of the battery 120 is from 10% to 80%, the processor 140 may return the robot cleaner 100 to the charging station 200 so as to clean all of the first to third subspaces. For example, when the first subspace and the second subspace are cleaned and the remaining amount of the battery 120 is decreased from 80% to 10% (70% used in total), the processor 140 may return the robot cleaner 100 to the charging station 200 and charge the battery 120 so that the remaining amount of the battery 120 coincides with the amount of battery 120 consumed (for example, 20%) required for the third subspace. When the additional charging is performed by 10% so that the remaining amount of the battery 120 becomes from 10% to 20%, 10 minutes is needed in total. Then, the processor 140 may control the robot cleaner 100 to clean the third subspace. In this case, the period of time required for cleaning all of the first to third spaces may be 10 minutes (period of time required for cleaning the first subspace)+20 minutes (period of time required for cleaning the second subspace)+10 minutes (period of time necessary to charge the battery)+10 minutes (period of time required for cleaning the third subspace), that is, 50 minutes in total.

The charging station 200 may be referred to as a docking station or a charger, and hereinafter, it is collectively referred to as the charging station 200, for convenience of description. The charging station 200 can wiredly or wirelessly charge the battery 120, and when the robot cleaner is docked, can provide various updates to the robot cleaner. The charging station can further include wireless communication features (not shown) for communication with the robot cleaner at any time.

The processor 140 according to one embodiment of the disclosure may identify the power amount required for cleaning the subspace based on the shape information of the subspace and cleaning mode corresponding to the subspace. As an example, although the first and second subspaces 10-1 and 10-2 have the same size (or area), the robot cleaner 100 may clean the first and second subspaces 10-1 and 10-2 in different cleaning modes, if the floor materials thereof are different from each other. In this case, a power amount required for cleaning the first subspace 10-1 and a power amount required for cleaning the second subspace 10-2 may be different from each other. As another example, although the first and second subspaces 10-1 and 10-2 have the same floor material, a power amount required for cleaning the first subspace 10-1 and a power amount required for cleaning the second subspace 10-2 may be different from each other depending on the sizes of the subspaces. The processor 140 according to one embodiment of the disclosure may identify the power amount required for cleaning each of the plurality of subspaces based on the map, and apply an order of priority to the plurality of subspaces based on the identified power amount and the remaining amount of the battery 120. Then, the processor 140 may set the movement path of the robot cleaner 100 according to the order of priority.

Returning to FIG. 2, the processor 140 according to one embodiment of the disclosure may identify a pollution level of the subspace based on a signal received through the sensor 150, while travelling along the set movement path. Then, the processor 140 may control the robot cleaner 100 to change the cleaning mode based on the pollution level and clean the corresponding subspace. This will be described in detail with reference to FIG. 7.

Figure 7:
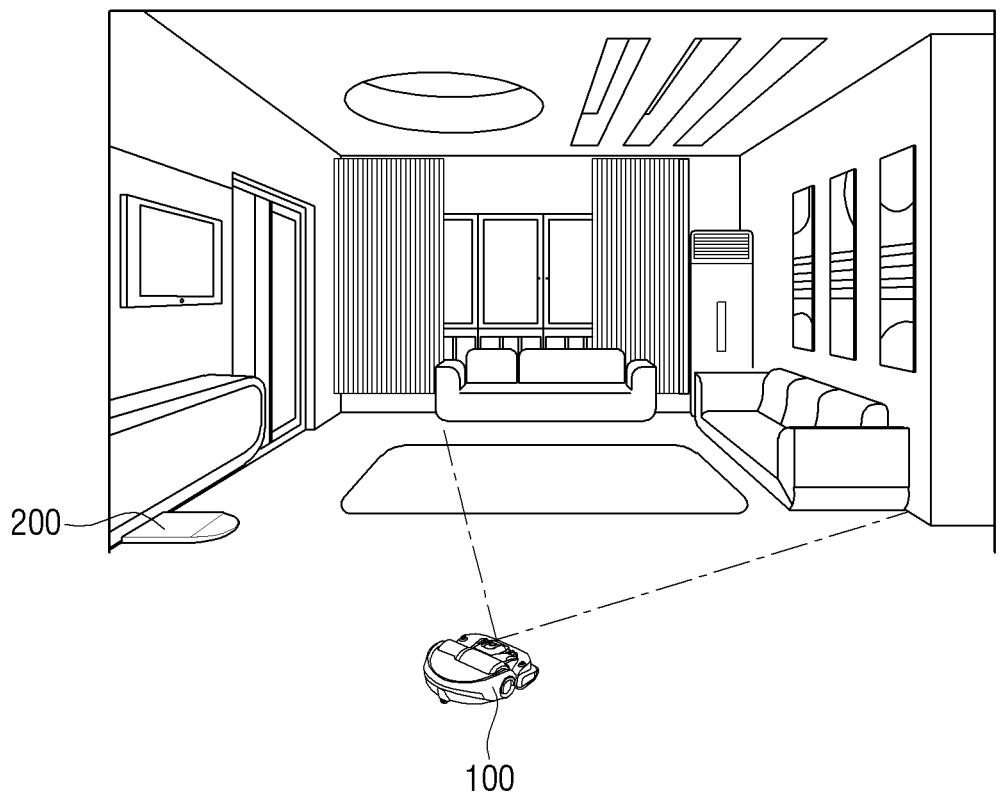
FIG. 7 is a diagram for describing a pollution level of a space according to an embodiment of the disclosure.

FIG. 7 is a diagram for describing a pollution level of a space according to an embodiment of the disclosure.

Referring to FIGS. 2, 5, 6, and 7, the processor 140 according to one embodiment may cause the robot cleaner 100 to travel along the set movement path. The robot cleaner 100 may identify foreign materials, obstacles, and the like during the travelling through the sensor 150. Then, the processor 140 may determine a pollution level of the corresponding subspace based on the identified materials, obstacles, and the like. For example, the processor 140 may identify a pollution level of the first subspace 10-1 through the sensor 150 while travelling the first subspace 10-1, and when the identified pollution level is equal to or more than a threshold value, the processor 140 may change the cleaning mode to increase a suction force. As another example, when the pollution level of the first subspace 10 is less than a threshold value, the processor 140 may change the cleaning mode to decrease a suction force.

As described above, even in a case where the cleaning mode is identified as the normal mode according to the floor material of the first subspace 10-1, the processor 140 may change the cleaning mode to the power mode, not the normal mode, when the pollution level of the first subspace 10-1 is determined to be slightly high.

As another example, even in a case where the cleaning mode is identified as the power mode according to the floor material of the second subspace 10-2, the processor 140 may change the cleaning mode to the normal mode, not the power mode, when the pollution level of the second subspace 10-2 is determined to be slightly low.

When the cleaning mode is changed, the processor 140 according to one embodiment may determine whether or not the remaining amount of the battery 120 exceeds the power amount required for cleaning the corresponding subspace based on the changed cleaning mode. For example, when the cleaning mode is changed from the normal mode to the power mode according to the pollution level of the first subspace 10-1, the processor 140 may re-identify the power amount required for cleaning the first subspace 10-1 in the power mode. Then, when it is determined that the remaining amount of the battery 120 is insufficient according to the re-identified power amount, the robot cleaner 100 may move to the charging station 200.

Returning to FIG. 2, when an object is detected through the sensor, the processor 140 according to one embodiment of the disclosure may identify that the corresponding object is a dynamic object or a static object. Then, when the corresponding object is identified as a dynamic object, the corresponding subspace may be excluded from the movement path based on at least one of the shape information and the floor material information of the corresponding subspace. This will be described in detail with reference to FIG. 8.

Figure 8:
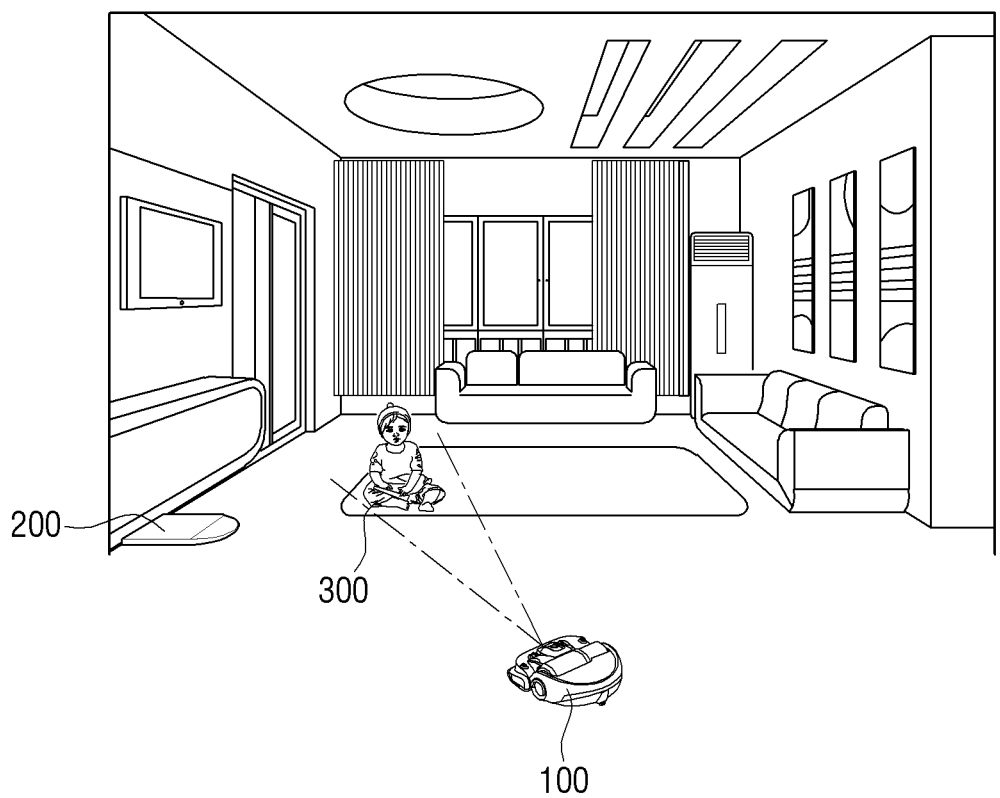
FIG. 8 is a diagram for describing a dynamic object according to an embodiment of the disclosure.

FIG. 8 is a diagram for describing a dynamic object according to an embodiment of the disclosure.

Referring to FIGS. 2 and 8, the processor 140 according to one embodiment of the disclosure may identify that the object is a dynamic object 300 or a static object by analyzing a signal received through the sensor 150. For example, the sensor 150 may include an obstacle detection sensor and the processor 140 may identify an obstacle based on a signal received through the sensor 150. Then, the processor 140 may identify whether or not the corresponding obstacle is a static obstacle fixed at a certain position or a dynamic object which moves to another position or movement of which is detected.

Referring to FIG. 8, the processor 140 may identify furniture, household appliances, walls according to the signal received through the sensor 150, and identify a person such as a baby. Hereinafter, a person and the like are collectively referred to as the dynamic object 300, for convenience of description.

When the dynamic object 300 is identified, the processor 140 according to one embodiment may exclude the corresponding subspace from the movement path based on at least one of the shape information or the floor material information of the subspace. As an example, when the floor material according to the position, where the dynamic object 300 is detected, is a carpet, the processor 140 may reset the movement path so that the robot cleaner 100 does not travel to the carpet. The processor 140 may exclude the subspace, in which an object such a baby, who may be injured when hit by the robot cleaner 100, is positioned, from the movement path of the robot cleaner 100.

As another example, the processor 140 according to one embodiment of the disclosure may control a display to display a position, where the dynamic object 300 is detected, on the map stored in the memory 130. Then, the processor 140 may identify a position, where the detection of the dynamic object 300 is displayed a predetermined number of times or more, on the map. For example, the position, where the detection of the dynamic object 300 is displayed, may be accumulated on the map according to the travelling of the robot cleaner 100. In this case, the processor 140 may identify the subspace corresponding to the position displayed a predetermined number of times or more. As an example, the processor 140 may identify the first subspace 10-1 as a subspace corresponding to a position, where the detection of the dynamic object 300 is displayed 10 times or more. Then, the processor 140 may exclude the identified first subspace 10-1 from the movement path of the robot cleaner 100. Here, 10 times are merely an example, and the predetermined number of times may be variously changed depending on the setting of a user.

The processor 140 according to another embodiment of the disclosure may set a danger level based on the number of times of the detection of the dynamic object 300 for each subspace. For example, when the number of times of the detection of the dynamic object 300 exceeds 10 times in the first subspace 10-1, the danger level may be set as 10. As another example, when the number of times of the detection of the dynamic object 300 is less than 5 in the second subspace 10-2, the danger level may be set as 1. In this case, the processor 140 may exclude the subspace having a danger level equal to or more than a predetermined level, from the movement path of the robot cleaner 100. As another example, a user may set a danger level for a certain subspace on a map of a space.

The processor 140 according to one embodiment of the disclosure may update the map based on a signal received through the sensor 150 during the driving of the robot cleaner 100. For example, the floor material of a lower portion of the robot cleaner 100 may be identified based on the signal received through the sensor 150 and may be compared with the floor material of the subspace, where the robot cleaner 100 is positioned, according to the map. Then, when the floor material identified based on the signal received through the sensor 150 and the floor material of the subspace identified based on the map are different from each other according to the comparison result, the map may be updated according to the floor material identified based on the signal received through the sensor 150. The processor 140 according to one embodiment may update the position information of the subspace, the shape information of the subspace, and the like based on the signal received from the sensor 150, in addition to the floor material.

The robot cleaner 100 according to one embodiment of the disclosure may include an interface (not shown) and a display (not shown).

The interface according to one embodiment may include a plurality of functional keys with which a user can set or select various functions supported by the robot cleaner 100. Such an interface may be realized as a device such as a plurality of buttons, or realized as a touch screen capable of executing a function of a display at the same time.

The display may display various pieces of information supported by the robot cleaner 100. Such a display may be a small-sized monitor such as an LCD or the like, or may be realized as a touch screen capable of executing the function of the interface described above.

The display may display information regarding an operation state of the robot cleaner 100 (the cleaning mode or charging mode), information regarding cleaning progress (for example, cleaning progress time, current cleaning mode (for example, suction intensity)), battery information, charging or discharging, whether or not a dust container is fully filled with dust, an error state (liquid contact state), and the like. When an error is detected, the display may display the detected error.

Figure 9:
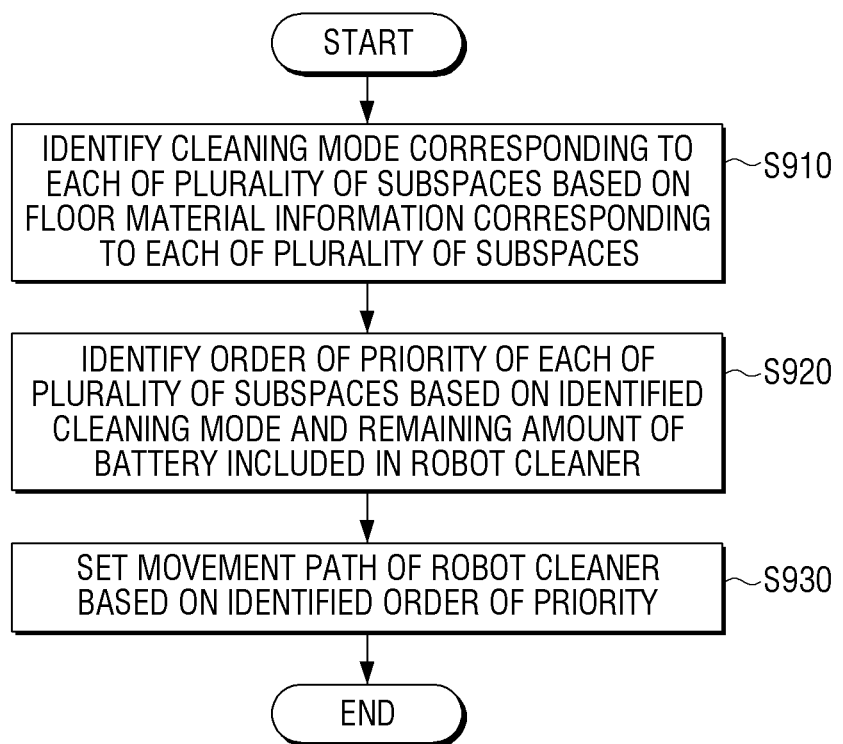
FIG. 9 is a flowchart for describing a control method of a robot cleaner according to an embodiment of the disclosure.

FIG. 9 is a flowchart for describing a control method of a robot cleaner according to an embodiment of the disclosure.

Referring to FIG. 9, in a control method of the robot cleaner according to one embodiment of the disclosure, first, a cleaning mode corresponding to each of a plurality of subspaces is identified based on floor material information corresponding to each of the plurality of subspaces at operation S910. Then, an order of priority is identified for each of the plurality of subspaces based on the identified cleaning mode and a remaining amount of a battery included in the robot cleaner at operation S920. Then, a movement path of the robot cleaner is set based on the identified order of priority at operation S930.

The control method according to one embodiment of the disclosure may include an operation of obtaining position information, shape information, and floor material information of each of the plurality of subspaces based on a signal received through a sensor included in the robot cleaner, and an operation of obtaining a map corresponding to the space based on the obtained information and storing the map in the memory.

Here, the sensor may include a camera, and the operation of obtaining the information may include an operation of obtaining floor material information by analyzing an image received through the camera.

In addition, the robot cleaner may include information regarding a sound absorption coefficient at a frequency for each floor material, and the operation of obtaining the information may include, when a frequency signal output from the sensor is reflected by a floor of the subspace and detected through the sensor, an operation of obtaining the floor material information based on the information regarding the sound absorption coefficient and an intensity of the reflected frequency signal.

The control method according to one embodiment may further include an operation of obtaining a cleaning mode corresponding to each of the plurality of subspaces and position information of each of the plurality of subspaces based on the map, and in the operation S930 of setting the movement path, the movement path of the robot cleaner may be set based on the identified order of priority and the position information of each of the plurality of subspaces.

According to one embodiment, a cleaning mode corresponding to a first subspace among the plurality of subspaces may be a normal mode, and a cleaning mode corresponding to a second subspace among the plurality of subspaces may be a power mode. In the operation of S920 of identifying the order of priority, when a remaining amount of the battery is less than a threshold value, an order of priority may be applied in an order of the first subspace and the second subspace.

In addition, the operation of S930 of setting the movement path may include, when a remaining amount of the battery is equal to or more than a power amount required for cleaning the first subspace and less than a power amount required for cleaning both of the first subspace and the second subspace, an operation of including a charging station to charge the battery, after cleaning the first subspace, in the movement path.

According to one embodiment, in the operation of S920 of identifying the order of priority, when a remaining amount of the battery is equal to or more than a threshold value, the order of priority may be applied in an order of the second subspace and the first subspace.

In addition, in the operation of S920 of identifying the order of priority, when a remaining amount of the battery is equal to or more than a threshold value, an order of priority may be applied in an order of a subspace closer to a current position of the robot cleaner based on position information of each of the first subspace and the second space.

The methods according to various embodiments of the disclosure described above may be realized in a form of application installable in existing electronic devices. In addition, the methods according to various embodiments of the disclosure described above may be realized only with software upgrading or hardware upgrading of existing electronic devices. In addition, various embodiments of the disclosure described above may be executed through an embedded server included in an electronic device or an external server of at least one of an electronic device or a display device. According to one embodiment of the disclosure, various embodiments described hereinabove may be realized with software including commands stored in machine (e.g. computer)-readable storage media. The machine is an apparatus which invokes commands stored in the storage medium and operates according to the invoked commands, and may include an electronic device (e.g.: electronic device A) according to the disclosed embodiments. In a case where the command is executed by a processor, the processor may execute a function corresponding to the command directly or using other constituent elements under the control of the processor. The command may include a code generated or executed by a compiler or an interpreter. The machine-readable storage medium may be provided as a form of a non-transitory storage medium. Here, the term "non-transitory" merely mean that the storage medium is tangible while not including signals, and it does not distinguish that data is semi-permanently or temporarily stored in the storage medium.

In addition, according to one embodiment of the disclosure, the methods according to various embodiments described above may be provided to be included in a computer program product. The computer program product is a commercially available product and traded between a merchandiser and a purchaser. The computer program product may be in a form of a compact disc read only memory (CD-ROM) or distributed online through an application store (e.g.: Playstore™). In a case of the online distribution, at least a part of the computer program product may be temporarily stored or temporarily generated at least in a storage medium such as a memory of a server of a manufacturer, a server of an application store, or an intermediate server.

In addition, each of constituent elements (e.g.: module or program) according to various embodiments described above may be configured with a single or a plurality of individuals, some sub-constituent elements may be omitted among the sub-constituents elements described above, or other sub-constituent elements may be further included in various embodiments. Generally and additionally, some constituent elements (e.g.: module or program) may be integrated as one individual and may execute the functions executed by each of the corresponding constituent element before the integration, in the same or similar manner. The operations executed by a module, a program, or other constituent elements according to various embodiments may be executed in a sequential, parallel, repetitive, or heuristic manner, at least some operations may be executed in a different order or omitted, or other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A robot cleaner comprising:
   a cleaner main body;
   a battery configured to supply a power;
   a memory configured to store floor material information corresponding to each of a plurality of subspaces configuring a space; and
   a processor configured to:
      identify a cleaning mode corresponding to each of the plurality of subspaces based on the floor material information corresponding to each of the plurality of subspaces,
      identify an order of priority of each of the plurality of subspaces based on the identified cleaning mode and a remaining amount of power, and
      set a movement path of the robot cleaner based on the identified order of priority.

2. The robot cleaner according to claim 1, further comprising:
   a sensor,
   wherein the processor is further configured to:
      obtain position information, shape information, and floor material information of each of the plurality of subspaces based on a signal received through the sensor, and
      obtain a map corresponding to the space based on the obtained information and store the map in the memory.

3. The robot cleaner according to claim 2,
   wherein the sensor comprises a camera, and
   wherein the processor is further configured to analyze an image received through the camera to obtain the floor material information.

4. The robot cleaner according to claim 2,
   wherein the memory is further configured to store information regarding a sound absorption coefficient at a frequency for each floor material, and
   wherein, when a frequency signal output from the sensor is reflected by a floor of the subspace and detected through the sensor, the processor is further configured to obtain the floor material information based on the information regarding the sound absorption coefficient and an intensity of the reflected frequency signal.

5. The robot cleaner according to claim 2, wherein the processor is further configured to:
   obtain a cleaning mode corresponding to each of the plurality of subspaces and position information of each of the plurality of subspaces based on the map stored in the memory,
   identify an order of priority of each of the plurality of subspaces based on the identified cleaning mode and a remaining amount of power, and
   set the movement path of the robot cleaner based on the identified order of priority and the position information of each of the plurality of subspaces.

6. The robot cleaner according to claim 1,
   wherein a cleaning mode corresponding to a first subspace among the plurality of subspaces is a normal mode,
   wherein a cleaning mode corresponding to a second subspace among the plurality of subspaces is a power mode, and
   wherein, when a remaining amount of power is less than a threshold value, the processor is further configured to apply an order of priority in an order of the first subspace and the second subspace.

7. The robot cleaner according to claim 6, wherein, when a remaining amount of power is equal to or more than a power amount required for cleaning the first subspace and less than a power amount required for cleaning both of the first subspace and the second subspace, the processor is further configured to include a charging station configured to charge the battery, after cleaning the first subspace, in the set movement path.

8. The robot cleaner according to claim 6, wherein, when a remaining amount of power is equal to or more than a threshold value, the processor is further configured to apply an order of priority in an order of the second subspace and the first subspace.

9. The robot cleaner according to claim 6, wherein, when a remaining amount of power is equal to or more than a threshold value, the processor is further configured to apply an order of priority in an order of a subspace closer to a current position of the robot cleaner based on position information of each of the first subspace and the second subspace.

10. The robot cleaner according to claim 1, further comprising:
   a sensor,
   wherein the processor is further configured to:
      identify a pollution level of a first subspace among the plurality of subspaces based on a signal received through the sensor, while travelling along the set movement path, and change the cleaning mode from a normal mode to a power mode based on the identified pollution level and clean the first subspace.

11. The robot cleaner according to claim 1, further comprising:
a sensor,
wherein, when an object is detected through the sensor, the processor is further configured to identify whether the object is a dynamic object or a static object, and
wherein, when the object is identified as a dynamic object, the processor is further configured to exclude the subspace from the movement path based on at least one of shape information or floor material information of the subspace.

12. A control method of a robot cleaner including floor material information corresponding to each of a plurality of subspaces configuring a space, the method comprising:
identifying a cleaning mode corresponding to each of the plurality of subspaces based on the floor material information corresponding to each of the plurality of subspaces;
identifying an order of priority of each of the plurality of subspaces based on the identified cleaning mode and a remaining amount of power included in the robot cleaner; and
setting a movement path of the robot cleaner based on the identified order of priority.

13. The method according to claim 12, further comprising:
obtaining position information, shape information, and floor material information of each of the plurality of subspaces based on a signal received through a sensor included in the robot cleaner; and
obtaining a map corresponding to the space based on the obtained information and storing the map in a memory.

14. The method according to claim 13,
wherein the sensor comprises a camera, and
wherein the obtaining comprises obtaining the floor material information by analyzing an image received through the camera.

15. The method according to claim 13,
wherein the memory stores information regarding a sound absorption coefficient at a frequency for each floor material, and
wherein the obtaining comprises, when a frequency signal output from the sensor is reflected by a floor of the subspace and detected through the sensor, obtaining the floor material information based on the information regarding the sound absorption coefficient and an intensity of the reflected frequency signal.

16. The method according to claim 13, further comprising:
obtaining a cleaning mode corresponding to each of the plurality of subspaces and position information of each of the plurality of subspaces based on the map,
wherein the setting of the movement path comprises setting the movement path of the robot cleaner based on the identified order of priority and the position information of each of the plurality of subspaces.

17. The method according to claim 12,
wherein a cleaning mode corresponding to a first subspace among the plurality of subspaces is a normal mode,
wherein a cleaning mode corresponding to a second subspace among the plurality of subspaces is a power mode, and
wherein, when a remaining amount of power is less than a threshold value, the identifying of an order of priority comprises applying an order of priority in an order of the first subspace and the second subspace.

18. The method according to claim 17, wherein the setting of the movement path comprises, when a remaining amount of power is equal to or more than a power amount required for cleaning the first subspace and less than a power amount required for cleaning both of the first subspace and the second subspace, including a charging station configured to charge a battery of the robot cleaner, after cleaning the first subspace, in the movement path.

19. The method according to claim 17, wherein the identifying of an order of priority comprises, when a remaining amount of power is equal to or more than a threshold value, applying an order of priority in an order of the second subspace and the first subspace.

20. The method according to claim 17, wherein the identifying of an order of priority comprises, when a remaining amount of power is equal to or more than a threshold value, applying an order of priority in an order of a subspace closer to a current position of the robot cleaner based on position information of each of the first subspace and the second subspace.

* * * * *